Oct. 21, 1924.
J. F. MILLER
1,512,625
HACK SAW BLADE
Filed Oct. 25, 1923
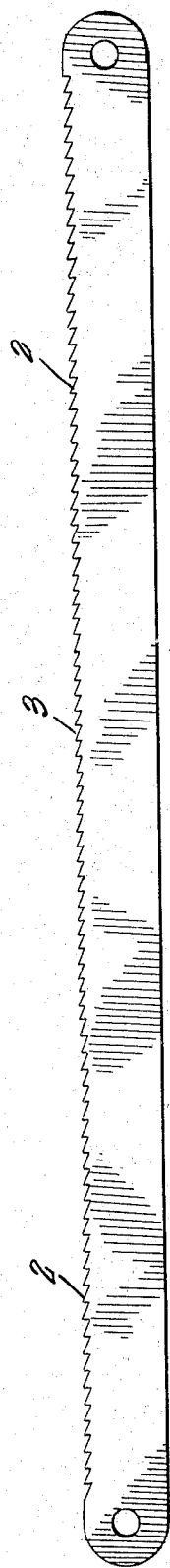
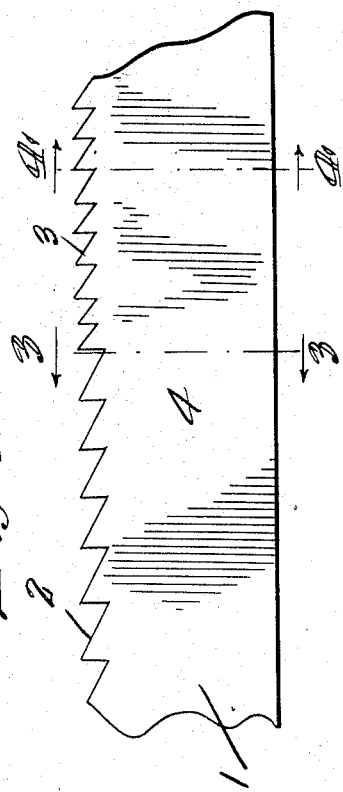
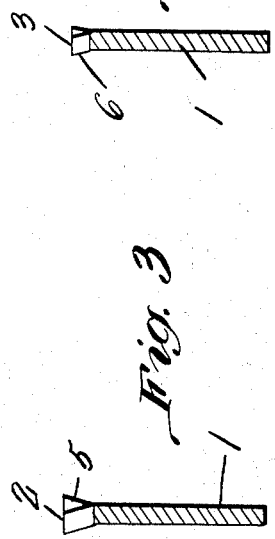
J. F. Miller, Inventor.
By C. A. Snow & Co.
Attorneys Patented Oct. 21, 1924.

1,512,625

UNITED STATES PATENT OFFICE.

JOSEPH FREDRICK MILLER, OF ELIZABETH, NEW JERSEY.

HACK-SAW BLADE.

Application filed October 25, 1923. Serial No. 670,744.

*To all whom it may concern:*

Be it known that I, JOSEPH FREDRICK MILLER, a citizen of the United States, residing at Elizabeth, in the county of Union and State of New Jersey, have invented a new and useful Hack-Saw Blade, of which the following is a specification.

By way of explanation, it may be stated that, when a hack saw blade has proceeded some distance into the metal, the hack saw blade not infrequently heats, binds and ultimately breaks. This invention aims to provide a hack saw blade wherein the undesirable features above mentioned will not be present.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1 shows in elevation, a hack saw blade constructed in accordance with the invention; Figure 2 is a side elevation on an enlarged scale, parts being broken away; Figure 3 is a cross section on the line 3—3 of Figure 2; Figure 4 is a cross section on the line 4—4 of Figure 2.

In carrying out the invention, there is provided a metal hack saw blade 1 equipped at its ends with a plurality of teeth 2 and equipped intermediate its ends with a plurality of teeth 3, the teeth 2 being longer than the teeth 3, as shown at 4, and the set 5 of the teeth 2 being greater than the set 6 of the teeth 3. There may be any desired number of the teeth 2, and any desired number of the teeth 3, but in practice, the saw will work well if the teeth 3 extend about one-third the length of the blade 1, each of the lines of the teeth 2 covering about one-third the length of the blade. The teeth 2 will open a comparatively wide cut in the work, and as soon as the blade shows any signs of binding, the sawing may be confined to the teeth 3, which will proceed readily into the work.

What I claim is:—

A hack saw blade provided at its ends with a plurality of terminal teeth, and equipped intermediate its ends with a plurality of secondary teeth, the terminal teeth being longer than the secondary teeth, and the set of the terminal teeth being greater than the set of the secondary teeth.

In testimony that I claim the foregoing as my own, I have hereto affixed my signature in the presence of two witnesses.

JOSEPH FREDRICK MILLER.

Witnesses:
 WILLIAM C. FISCHER,
 M. R. WORTH.